Feb. 2, 1932.   P. C. RIPLEY   1,843,303
SEALED CORED SOLDER AND METHOD OF SEALING THE SAME
Filed Feb. 13, 1930
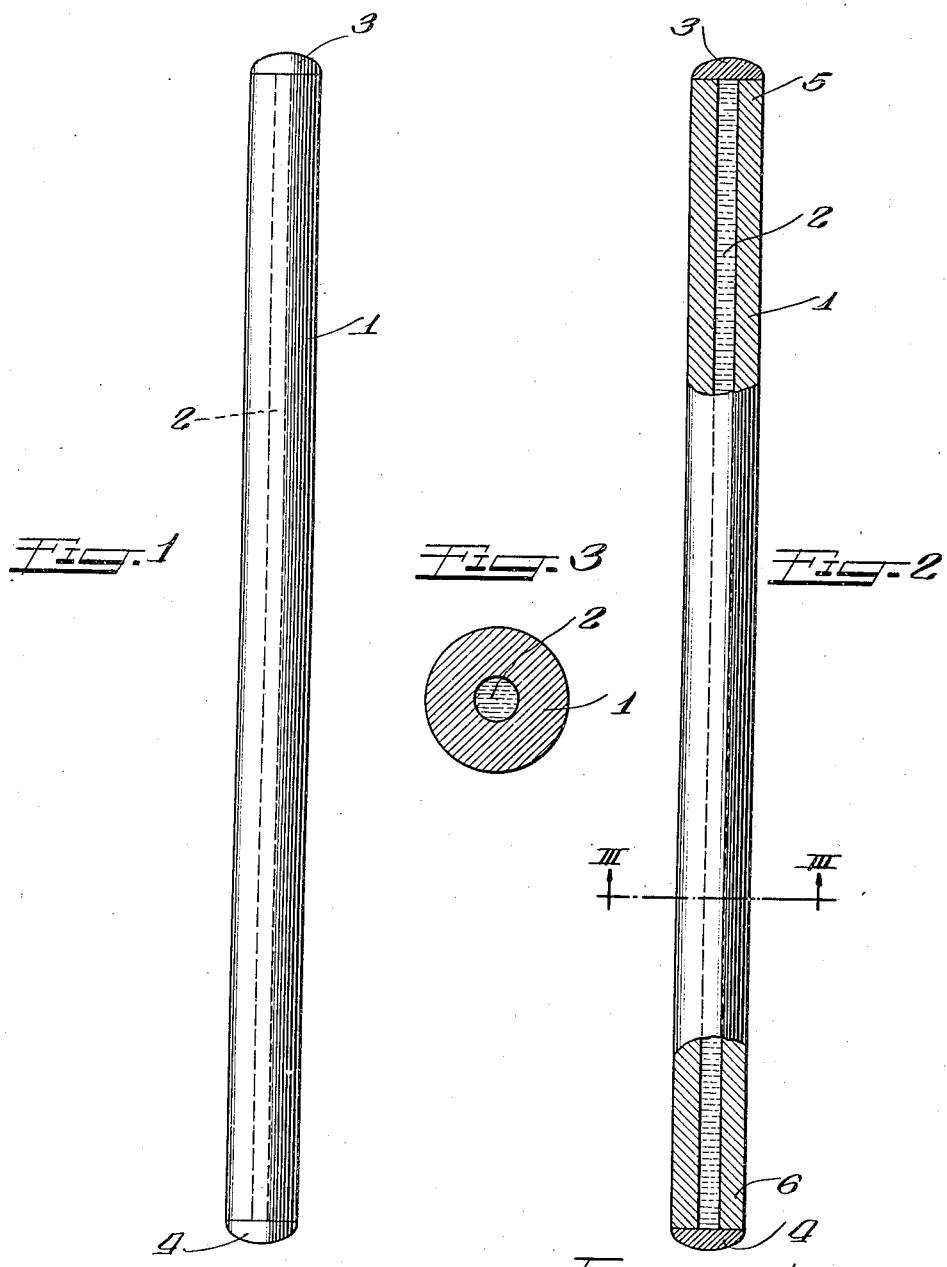
Inventor:
Perry C. Ripley.
by: Charles H. Fields Atty.

Patented Feb. 2, 1932

1,843,303

UNITED STATES PATENT OFFICE

PERRY C. RIPLEY, OF CHICAGO, ILLINOIS, ASSIGNOR TO KESTER SOLDER COMPANY, OF CHICAGO, ILLINOIS, A CORPORATION OF ILLINOIS

SEALED CORED SOLDER AND METHOD OF SEALING THE SAME

Application filed February 13, 1930. Serial No. 428,079.

This invention relates to a method for hermetically sealing the ends of hollow objects and more particularly to a method for sealing the ends of flux core solder to prevent deterioration of the solder flux and loss of the flux through evaporation and leakage prior to the use of the solder. The invention further contemplates the sealed articles so formed.

As generally constructed, cored solder, especially hollow wire solder, is in the form of hollow shells or tubes filled with a flux of a liquid, plastic or granular nature. The cross section of the tubes or shells assume various forms and may be oval, flatly rectangular or circular. This solder is supplied to the trade in strands of varying diameters mounted upon spools or loosely wound in coils, or in the form of short lengths or sticks packed in suitable containers.

Loss of flux from the hollow tubes or shells is prevented in practice by closing and sealing the ends of the tubes, generally by flatly compressing or squeezing together the ends of the tubes under pressure. This method is, however, open to serious objection in that it does not produce a seal which will effectively resist rupture and prevent leakage of flux from the tubes or shells, especially if the tubes or shells are filled with a plastic or liquid solder flux. The ineffectiveness of the joint produced by this method is largely due to the lack of adhesion between the contacting surfaces of the joints and to the fact that hydrostatic pressure is generated in the flux in the tube during the sealing process, especially if a liquid or plastic flux is employed. For instance, if an 18" length of hollow solder wire filled with a liquid or plastic flux is sealed as by compressing at one end a length of tube equal to one-half inch, flux will be exuded from the opposite end of the tube. Now, upon flatly compressing the open end of the tube, hydrostatic pressure is generated in the flux and transmitted to the closed end of the tube, which will be broken open at the joint because of the lack of adhesion and the ductility of the metal alloy.

Moreover, experience has shown that when flux core solder sealed in this manner is shipped into warm climates or subjected to high temperatures during transportation or storage, the flux because of its higher coefficient of expansion than solder, expands at a greater rate than the solder tubes, thereby further springing the joints in the ends of the tubes and occasioning a further amount of flux leakage.

The leakage of the flux from the solder tubes discolors both the solder and package besides making the handling of the same disagreeable. Furthermore, leakage leaves the entire flux content open to the atmosphere, thereby frequently stimulating flux decomposition, which renders both the flux and solder practically useless for the purpose intended. It can thus be appreciated that the provision of strong, reliable end seals for cored solder of this type is of prime importance in this art.

I have now discovered a method for closing the ends of cored solder whereby a hermetically sealed tube is produced, the seal being sufficiently strong to withstand expansion of the flux caused by hydrostatic pressure set up in the closed tubes as occasioned by changes in temperature in the transportation and storage of the solder.

My invention consists broadly in sealing the ends of the solder tubes by soldering to such ends a sealing alloy which readily dissolves the various solder alloys of lead and tin at a temperature below the melting point of the solder alloy so that the sealing takes place at a temperature sufficiently low to prevent undue expansion of the solder flux and bursting of the seals before the sealing alloy solidifies. I have found that the sealing alloys most suitable for this purpose, are alloys of lead-tin-bismuth, lead-tin-cadmium, lead-tin-cadmium and bismuth, and certain low melting lead-tin alloys.

It is accordingly an object of this invention to provide a process for sealing the ends of hollow wire solder by soldering thereto an alloy which readily dissolves solder at a temperature below the melting point of solder.

It is a further object of this invention to provide a method for forming seals for the ends of cored solder by soldering thereto an alloy of lead, tin and bismuth.

It is a further object of this invention to provide a process for sealing the ends of cored solder by dipping the solder into a uniformly heated bath of a lead-tin-bismuth alloy and utilizing the flux of the cored solder as a fluxing agent in the soldering step.

It is a further object of this invention to provide a cored solder having its ends sealed by means of an alloy soldered thereto.

Other and further important objects of this invention will become apparent from the following description and appended claims.

Referring now to the drawings which disclose a preferred embodiment of the article of this invention:

Figure 1 is a front elevation of a flux core solder showing the ends sealed by the method of this invention;

Figure 2 is a view similar to Figure 1 with parts broken away to show the joint between the sealing alloy and the cored solder; and Figure 3 is a section on line III—III of Figure 2.

In order to effect the strong reliable seal of this invention it is necessary to take into consideration three important conditions regarding the nature of the alloy to be used and the apparatus to be employed in effecting the soldering of the alloy to the cored solder. The alloy used to form the seal should have the property of dissolving any lead-tin alloy regardless of the ratio of the metals in the same and at a temperature so low that the contained flux will not expand unduly and force the seal open prior to its solidification. It is also necessary to provide an apparatus in which the soldering takes place at an accurately regulated temperature in order to secure a successful soldering of the alloy seal and solder proper. This apparatus requirement is met by providing the solder pot described and claimed in a copending application filed of even date herewith.

A number of alloys which may be mentioned as successfully meeting the above requirements, are alloys of tin-lead-cadmium-bismuth, tin-lead-cadmium, tin-lead-bismuth and in certain cases with certain types of flux, low melting lead-tin alloys. It is preferable, however, to select an alloy which melts below the boiling point of water so that the ends of cored solder may be sealed by my method even when water is a component of the solder flux. An alloy composed of 50% bismuth, 25% tin and 25% lead, effectively answers this purpose. This alloy provides a perfect seal for flux core solder irrespective of the constituents of the solder flux. This result, to the best of my knowledge, has never been obtained heretofore and cannot be obtained in the case of solder containing aqueous or low boiling fluxes if an alloy containing only lead and tin is used, even though the temperature of the soldering operation be carefully and accurately regulated.

To form my improved hermetic seal, an alloy as specified above is fused in a solder pot of the type disclosed in my said copending application. One end of a flux cored solder stick indicated on the drawings by reference numeral 1 and having a flux core 2, is then dipped for an instant into the molten alloy bath. The temperature of the bath is carefully regulated during the dipping operation in order to prevent an unnecessarily high temperature which would cause undue expansion of the solder flux. The dipping of the stick 1 causes dissolution of the solder of the stick and intermingling of the solder and alloy so that when the stick is removed from the bath and allowed to cool a cap or button 3 of the alloy is soldered fast to the end of the stick thereby sealing said end.

The stick is then inverted and the open end of the same sealed in the same manner to produce the alloy cap or button 4.

During the soldering of the alloy to the ends of stick 1, the flux core 2 of the stick furnishes the soldering flux for the operation. This flux wets only the end wall of the stick and does not flow along the side walls of the stick so that the sealing alloy adheres only to said end wall.

In this manner, flux core solder, such as indicated in the drawings, hermetically sealed by the closures 3 and 4 at the ends 5 and 6 thereof, is produced. These closures effectively prevent leakage of solder flux from the stick 1 and the exposure of the flux core to the atmosphere, thus greatly increasing the efficiency and practical value of the solder.

While I have disclosed my invention as applicable to the sealing of the ends of cored solder, it is to be understood that this is not to be construed as a limitation, as it is apparent that my process may be used for sealing the ends of many other hollow articles formed from solder alloys or the like. It should also be borne in mind that while the particular lead-tin-bismuth alloy described above is to be preferred, other alloys such as mentioned herein and known to the art, may be employed to produce the hermetically sealed ends.

It can thus be appreciated that I have devised a very efficient method of sealing the ends of cored solder whereby the objectionable leakage of flux from the solder ends together with its attendant disadvantages is substantially overcome.

It is, of course, to be understood that various details of my invention may be modified without departing from the spirit of the invention disclosed and, accordingly, I do not purpose to limit my invention except as necessitated by the prior art.

I claim as my invention:

1. The method of preventing leakage or decomposition of flux in tubular solder, which comprises immersing an end of said tubular solder into a bath of a molten sealing alloy capable of dissolving the metal constituents of the tubular solder below the melting point of said tubular solder while maintaining said sealing alloy at a sufficiently low temperature to prevent the generation of a fluid pressure caused by expansion of said flux within said tubular solder such as would disrupt the seal during its formation and withdrawing said immersed end to permit the newly attached sealing alloy to solidify and form an hermetic seal for said end.

2. The method of preventing leakage or decomposition of flux in a tubular solder, which comprises immersing an end of said tubular solder into a bath of a molten sealing alloy consisting of bismuth, tin and lead in the proportion of 2:1:1—while maintaining said sealing alloy at a sufficiently low temperature to prevent the generation of a fluid pressure caused by expansion of said flux within said tubular solder such as would disrupt the seal during its formation and withdrawing said immersed end to permit the newly attached sealing alloy to solidify and form an hermetic seal for said end.

3. The method of sealing an end of a flux core tubular solder the flux of which contains a constituent that is volatile at or below the boiling point of water, which comprises dipping an end of said tubular solder into a bath of molten sealing alloy maintained at a temperature sufficiently low to prevent the generation of pressure from vaporization of said volatile flux constituent such as would disrupt the newly formed seal and withdrawing said end to allow the attached sealing alloy to solidify.

4. The method of sealing an end of a flux core tubular solder the flux of which contains a constituent that is volatile at or below the boiling point of water, which comprises dipping an end of said tubular solder into a bath of molten sealing alloy consisting of two parts of bismuth and one part each of tin and lead, maintaining said bath at a temperature sufficiently low to prevent the generation of pressure from vaporization of said volatile flux constituent such as would disrupt the newly formed seal and withdrawing said end to allow the attached sealing alloy to solidify.

5. As a new article of manufacture, a flux core tubular solder having an end closure of a sealing alloy hermetically closing said end, said sealing alloy having been alloyed to said tubular solder end by immersing said end in a bath of the molten sealing alloy at a temperature sufficiently low to prevent the generation of a fluid pressure caused by the expansion of the flux within said tubular solder such as would disrupt the end closure during its formation.

6. As a new article of manufacture, a flux core tubular solder containing a flux constituent volatile at or below the boiling point of water and having an end closure of a sealing alloy hermetically closing said end, said sealing alloy consisting of two parts of bismuth and one part each of tin and lead and having been alloyed to said tubular solder end at a temperature sufficiently low to prevent the generation of a fluid pressure by vaporization of said volatile flux constituent within said tubular solder such as would disrupt the end closure during its formation.

7. As a new article of manufacture, a flux core tubular solder containing a flux constituent volatile at or below the boiling point of water and having an end closure of a sealing alloy hermetically closing said end, said sealing alloy being capable of dissolving the metal constituents of the tubular solder below the melting point of said tubular solder and having been alloyed to said tubular solder end at a temperature sufficiently low to prevent the generation of a fluid pressure by vaporization of said volatile flux constituent within said tubular solder such as would disrupt the end closure during its formation.

8. As a new article of manufacture, a flux core tubular solder having a button of a sealing alloy hermetically sealing the end of said tubular solder and formed by immersion alloying in molten sealing alloy at a temperature sufficiently low to prevent the generation of a fluid pressure caused by expansion of said flux within said tubular solder such as would disrupt the button of the sealing alloy during formation of said button.

In testimony whereof I have hereunto subscribed my name at Chicago, Cook County, Illinois.

PERRY C. RIPLEY.